United States Patent [19]

Melbard et al.

[11] 3,748,431
[45] July 24, 1973

[54] APPARATUS FOR AUTOMATIC CONTROL OF A MACHINE FOR FLASH BUTT WELDING OF METAL PARTS

[76] Inventors: Sergei Nikolaevich Melbard, ulitsa Akademika Pavlova, 50, kv. 75; Anatoly Fedorovich Shakhnov, Kolomensky pereulok, 5, korpus 1, kv. 66; Alexandr Shmulevich Gelman, Tretya Tverskaya Yamskaya ulitsa, 42/8, kv. 46, all of Moscow; Ezra Shmulevich Slepak, Moskovskoi oblasti, ulitsa Turgeneva, 22, Malakhovka; Svyatoslav Nikolaevich Vivsik, Bolnichny pereulok, 3, kv. 56, Podolsk; Anatoly Ivanovich Bondarev, ulitsa Entuziastov, 3, kv. 38, Podoslk; Leonid Pavlovich Desyatskov, Severny Tupik, 5, kv. 14, Podolsk; Vladimir Sergeevich Morozov, Moskovskoi oblasti, Tsentralnaya ulitsa, 90, Bulatnikovo, all of U.S.S.R.

[22] Filed: June 4, 1971

[21] Appl. No.: 150,124

[52] U.S. Cl. .................................. 219/97, 219/110
[51] Int. Cl. ........................ B23k 9/10, B23k 11/04
[58] Field of Search ...................... 219/97, 98, 108, 219/110, 127

[56] References Cited
UNITED STATES PATENTS

| 3,204,078 | 8/1965 | Cavanagh | 219/97 |
| 3,048,692 | 8/1962 | Bichsel et al. | 219/127 X |
| 3,479,480 | 11/1969 | Erwin et al. | 219/97 |

*Primary Examiner*—R. F. Staubly
*Attorney*—Waters, Roditi, Schwartz & Nissen

[57] ABSTRACT

An apparatus belonging to the class of adaptive automatic-control systems, comprising elements which allow welding to be conducted according to a preset program of the flashing current changing as a function of movement of the movable platen and to respond, with the help of feedback, to changes occurring in the welding process, for instance, changes in the torque of the drive of the movable platen, which influence changes in welding current, with a high degree of accuracy. A distinctive feature of the apparatus is the use of an adjusting regulator with a memory cell, which permits the preset program to be automatically adjusted in the most advantageous manner in accordance with changing conditions, for instance, variations in the cross-section of the workpiece from one welding process to another within tolerable limits, changes in the material of the workpiece being welded, etc.

4 Claims, 2 Drawing Figures

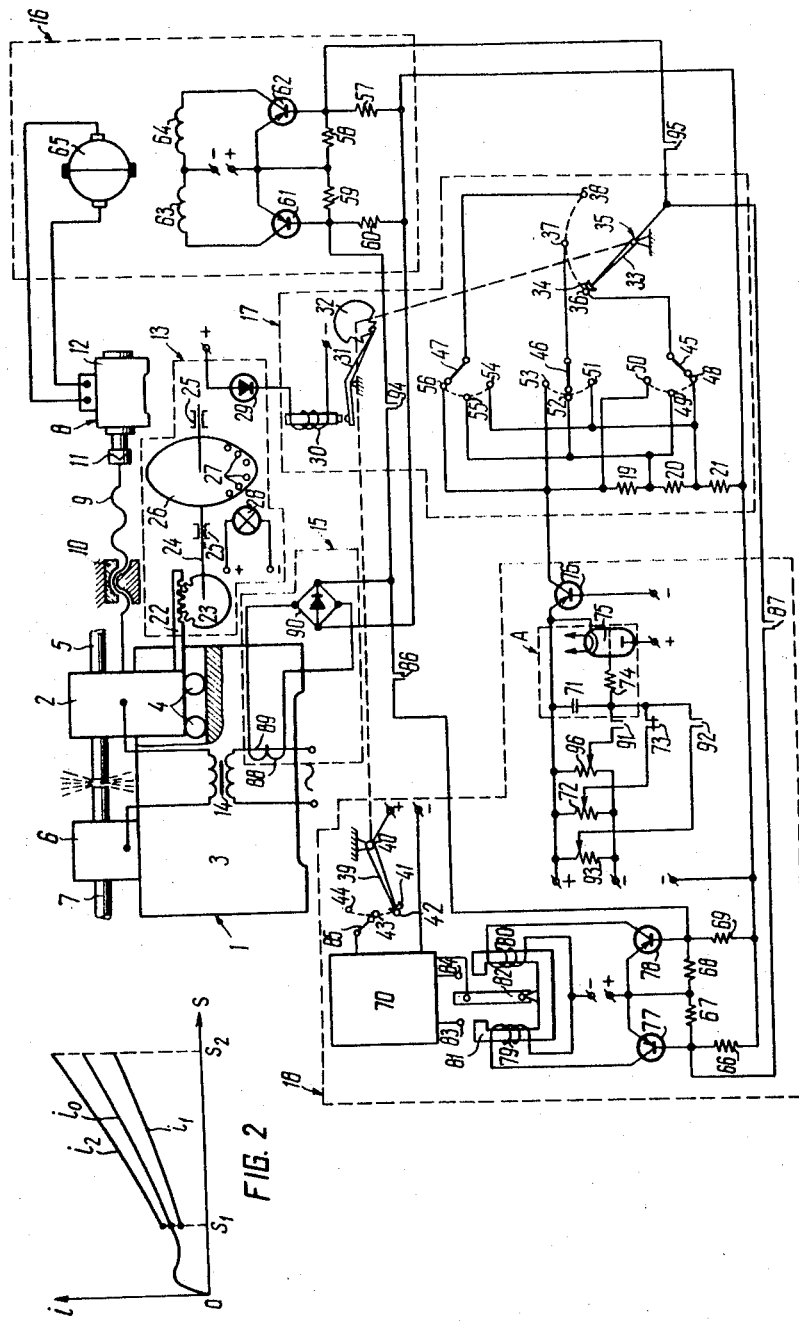

APPARATUS FOR AUTOMATIC CONTROL OF A MACHINE FOR FLASH BUTT WELDING OF METAL PARTS

CROSS REFERENCE TO RELATED APPLICATION

This application is a division of my application Ser. No. 863,450, filed Oct. 3, 1969, now abandoned, for COMPACT VOICE UNIT.

The present invention relates to a plan for the flash butt welding of metal parts and, more particularly, to an apparatus for automatic control of a flash-butt welding machine.

The present invention may advantageously be used in the fabrication of pipes with a cross-sectional area of 2,500 $mm^2$ and more, intended for service under conditions of high pressure and elevated temperature, such as in boilers. Advantageously the invention may be utilized in the welding of metal parts which are to meet stringent requirements for surface finish.

A flash-butt welding machine for metal parts is known to comprise a moving platen and a clamping block mounted on a bedframe so that the platen can travel towards or away from another clamping block mounted on the bedframe. The said two clamping blocks hold the workpieces to be welded. Also, the machine incorporates a welding transformer to supply electric energy to the workpieces and an automatic control apparatus connected to the drive of the moving platen. The control apparatus comprises a setting device which sets the travel of the moving platen as a function of time. The butts of the workpieces are burned off, or flashed, each by a requisite amount, and the parts are then brought together under pressure or are upset.

It is also known that the supply mains voltage is subject to variations, and so is the resistance of the welding circuit in the course of welding. The prior-art control apparatus is not adapted to take into account such disturbances, and the resultant flash-butt welds are of relatively low quality.

Investigations have shown that the flashing of the workpieces and, as a consequence, the quality of the resultant flash-butt welds are mainly controlled by the magnitude of welding current and the frequency of current pulses. However, it is only the current during the flashing stage that determines most of all the temperature gradient in the direction of motion of the moving platen, the surface condition of the workpiece faces, the stability of flashing, etc.

Known in the prior art is an automatic control apparatus which determines the magnitude and sign of the error, that is, the difference between the preset and actual values of the flashing current. Should the error signal exceed the preset value, the apparatus turns off the welding transformer and causes the moving platen to take up its starting position (see, for example, USSR Inventor's Certificate No. 172413, 1965).

The major difficulty associated with the use of this control apparatus is that variations in flashing current are not eliminated by the same apparatus, so that time has to be spent to detect the causes of these deviations and effort has to be made to eliminate these deviations with the aid of additional means.

It is an object of the present invention to avoid the above-mentioned disadvantages.

The invention aims at providing an apparatus which both controls the current in a predetermined manner according to the path travelled by the moving platen and adjusts this control according to varrying conditions.

With this aim in view, the invention resides in that a control apparatus, in addition to a welding-current sensor, has a moving-platen travel sensor connected to the control box via a current-setting device, and also a regulator which adjusts the signals of this device according to the magnitude of the signal from the welding-current sensor after all marked transients usually present in the welding current during the early stage of flashing have subsided.

Experiments have shown that the purpose of the present invention is best served by a regulator comprising a resistance bridge one arm of which is connected to the output of the welding-current sensor and another arm to the input circuit of the current-setting device. At the same time, it is preferable to connect a storage network to the output circuit of said resistance bridge and to the input circuit of said current-setting device.

The storage network should preferably be a network containing a cathode follower, with its input circuit connected to the output circuit of the resistance bridge via a capacitor and its output circuit connected to the current-setting device.

The travel sensor will be more reliable in operation if its key part is a disc with windows, coupled to the moving platen of the welding machine so that the disc rotates as the platen moves. At the same time, there should be a light source on one side of the disc, and a photo-cell on the other, the transducer of this sensor being preferably a light-pulse counter.

A major advantage of the present invention consists in that there is a substantial decrease in the shut-down time of the plant, predominantly boilers, because of failures traceable to welding flaws when they use the pipes and tubes welded with the apparatus according to the invention.

The invention will be more fully understood from the following description of a preferred embodiment of the invention, when read in connection with the accompanying drawings, wherein:

FIG. 1 is a schematic circuit diagram of a machine for the flash butt welding of metal parts and an apparatus for automatic control of this machine;

FIG. 2 is a plot of current as a function of platen travel.

Referring to FIG. 1, there is an apparatus controlling a flash-butt welding machine 1 which comprises a moving platen 2 set up on a bedframe 3 with the aid of rollers 4 and carrying a clamping block (omitted in the drawing) to hold one of the workpieces, say a pipe 5. The bedframe gives support to another clamping block 6 to hold the other workpiece, say a pipe 7. The moving platen 2 is coupled to its drive 8 comprising a lead screw 9 rotating in a lead nut 10 attached to the bedframe 3 of the machine. The lead screw 9 is coupled by a jaw clutch 11 to an electric motor 12. The moving platen 2 is also coupled to a travel sensor 13 which senses the distance travelled by that platen, while the primary winding of a welding transformer 14 is connected to a welding-current sensor 15. The travel sensor 13 is connected to a control box 16 via a current-setting device 17. Also, there is a regulator 18 to adjust the signals of the device 17 according to the magnitude of the signal furnished by the welding-current sensor 15.

Referring to FIG. 2, the early stage of burn-off, or flashing, is represented by a straight-line segment $OS_1$ laid off along the S-axis which represents, according to a scale, the distance travelled by the moving platen 2 (FIG. 1). This stage being characterized by substantial fluctuations in the welding or flashing current $i_o$; no control is effected during this stage. At a predetermined point $S_1$, when these fluctuations have practically subsided and a steady state has set in, the travel sensor 13 of the moving platen 2 generates a signal which activates the regulator 18, and this begins to compare the current set by the current-setting device 17 with the actual current measured by the welding-current sensor 15. If there is a difference between the two current values, the signals of the current-setting device 17 are adjusted automatically so as to reduce the difference to zero, by varying the voltage across a voltage divider made up of resistors 19, 20, and 21 and built into the said current-setting device. The adjusted value of welding current, $i_1$ or $i_2$ (FIG. 2), is stored by a storage network A (FIG. 1) of the regulator 18, and the welding operation proceeds to the adjusted program. As a result, a constant ratio of the actual to preset current, that is $i_1/i_o$ or $i_2/i_o$, is maintained for any point along the path travelled by the moving platen 2. At point $S_2$, the workpieces are upset.

The travel sensor 13 of the moving platen 2 has a rack 22 made fast to said platen and engaging a pinion 23 mounted on a shaft 24 carried by bearings 25. The same shaft 24 mounts a disc 26 with through holes 27. There is a light source, a lamp 28, on one side of the disc, and a photo-diode 29 on the other, controlling an electromagnet 30. The photo-diode is conducting and the electromagnet 30 is energized when one of the holes 27 passes light from the lamp 28 to the photodiode 29. As the moving platen 2 travels, the disc 26 rotates and chops the light beam, because of which the electromagent 30 is energized and de-energized periodically. As a result, the electromagnet 30 imparts an oscillating motion to a two-arm lever 31, and the end of this lever causes a spring-loaded ratchet wheel 32 to advance one tooth at a time. The ratchet wheel 32 is connected to the wiper 33 of a stepping switch 35, having a contact tip 34. As the ratchet wheel 32 advances, the wiper 33 turns, and its tip 34 consecutively touches fixed contacts 36, 37, and 38 of the stepping switch 35. Also, the ratchet wheel 32 is connected to the wiper 39 of another stepping switch 40 built into the regulator 18. This wiper has a contact tip 41 which consecutively touches fixed contacts 42, 43 and 44 of the stepping switch 40. The tips of the said wipers 33 and 39 move from one fixed contact to another simultaneously for every millimeter travelled by the moving platen 2 (in the drawing, the number of fixed contacts has been reduced for clarity). The electromagnet 30, the two-arm lever 31, the ratchet wheel 32, and the wipers 33 and 39 make up a light-pulse counter.

The number of resistors in the voltage divider of the current-setting device 17 is selected according to the desired accuracy of control (the drawing shows three resistors, 19, 20, and 21). A program to which the welding current is to be controlled can be set up by means of switches 45, 46, and 47 and contacts 48 through 50, 51 through 53, and 54 through 56 respectively selected by the said switches connected to the said voltage divider, and this program is then read off by the stepping switch 35, while the signals corresponding to this program are relayed by this stepping switch to a resistor 57 of a resistance bridge formed by resistors 57, 58, 59 and 60 and built into the control box 16. In the course of flashing, another resistor, 60, of this bridge accepts signals from the welding current sensor 15. The difference between the signals applied to the resistors 57 and 60 determines the voltage drop across the resistors 58 and 59 from which a signal proportional to this difference is applied to transistors 61 and 62 where it is amplified and applied to windings 63 and 64, connected in the same polarity, of a rotary amplifier 65 which controls the electric motor 12 driving the moving platen 2 (the drawing does not show the rotary-amplifier winding which sets the initial speed of the moving platen 2). Since the windings 63 and 64 are connected in the same polarity, an increase in the actual welding current above its preset value will cause the motor 12 to slow down; should the difference between the two values reach a definite level, the motor may reverse. If the actual welding current is below its preset value, the speed of the motor 12 is increased.

In addition to the storage network A, the regulator 18 incorporates a resistance bridge composed of resistors 66 through 69 and a relay assembly 70. The bridge arm containing the resistor 69 is connected to the output of the welding-current sensor, while the bridge arm containing the resistor 66 is connected to the input circuit of the current-setting device 17. The storage network A is connected to the output circuit of said resistance bridge on one side and to the input circuit of the current-setting device on the other.

When the moving platen 2 is in its starting position, the voltage across the divider of the current-setting device 17 is determined by the voltage across the capacitor 71 in a storage network A, which is in turn determined by the setting of a resistor 72 connected via a N.C. contact 73 of the relay assembly 70 to the capacitor 71. As the voltage across the capacitor 71 changes, the voltage across the voltage divider of the current-setting device 17 will change too because the capacitor 71 and the current-setting device are interconnected by a resistor 74 of a cathode follower 75 and a transistor 76. During a comparison, the resistors 66 and 69 of the resistance bridge in the regulator 18 accept signals from the current-setting device 17 and the welding-current sensor 15, the difference between which determines the voltage across the resistors 67 and 68 of the said resistance bridge. This difference or error signal, proportional to this voltage, is amplified by transistors 77 and 78 in the regulator 18 and applied to windings 79 and 80, connected in the same polarity, of a polarized relay 81. According to the polarity of the signal, the movable contact 82 of the relay 81 closes contact 83 or 84 of the relay assembly 70.

The relay assembly 70 comprises several relays (not shown in the drawing) that switch the respective circuits of the control apparatus. A command to switch a particular circuit comes to the relay hole 70 from the stepping switch 40 via the fixed contact 43 or 44, according to the position of a switch 85.

The sequence of operations in flash-butt welding according to the invention is as follows.

The desired program of welding-current control is set up with the switches 45, 46, and 47 of the current-setting device 17. The instant at which the relay assembly 70 and, as a consequence, the entire regulator 18 is to operate is set with the switch 85 of the relay assembly 70. This instant is chosen according to the distance to be travelled by the moving platen 2. For example, this instant may be set at a distance of 2 mm from the starting position of the moving platen 2. After that the initial speed of the moving platen 2 is set with a winding on the rotary amplifier 65, already mentioned but not shown in the drawing. Next, the rotary amplifier 65 is connected to the motor 12, and the moving platen 2 may be moved towards the clamping block 6. Just as the workpieces (pipes) 5 and 7 touch each other, a welding current is passed through them.

As the moving platen 2 travels, the travel sensor 13 of that platen sends out signals to the stepping switches 35 and 40 at equal intervals of the path travelled. If a switch 85 closes the contact 43, and the wiper 39 also touches this contact 43, the relay assembly 70 operates and closes contacts 86 and 87. As a result, a voltage is applied to the resistor 69 of the resistance bridge in the regulator 18 from the welding-current sensor 15, proportional to the actual flashing current. The sensor 15 incorporates a current transformer 88 whose turns envelope a lead 89 to the primary winding of the welding transformer 14, and a semiconductor rectifier 90. The resistor 66 of the said reSistance bridge accepts a voltage from the current-setting device 17. If the two voltages are not equal, a signal is applied to the polarized relay 81 from the said resistance bridge, and the relay closes the contact 84 or 83, according to the polarity of this signal, for the duration of comparison. As any of these contacts closes, the relay assembly 70 opens the N.C. contact 73 in the grid circuit of the cathode follower 75 and closes contact 91 or 92, according to whether the contact 83 voice 84 is closed in the polarized relay 81.

Suppose that the faces of the components being welded have increased in surface area. Then the signal coming from the welding-current large sensor 15 will exceed the signal coming from the current-setting device 17 and represent the preset value of the current. A contact 92 controlled by the relay assembly 70 will close and the capacitor 71 will be connected to a resistor 93. As a result, the cathode follower 75 will be driven to conduction, and the voltage applied to the resistors 19 through 21 of the current-setting device 17 via the transistor 76 will rise. At the same time, the voltage across the resistor 66 of the resistance bridge in the regulator 18 will also rise to a level corresponding to that of the voltage across the resistor 69 of the said resistance bridge. At the instant when the two voltages become equal, the polarized relay 81 drops out, the contact 92 opens, and the capacitor 71 is disconnected from the resistor 93. From that instant on, the welding proceeds at the voltage stored by the capacitor 71 after the above-described adjustment of the program by comparing the signals of the sensors 13 and 15. After the capacitor 71 has been disconnected from the resistor 93, the contacts 86 and 87 will open, and contacts 94 and 95 will close.

If the signal from the welding-current sensor 15 exceeds that from the current-setting device 17, the regulator will bring down the voltage across the capacitor 71 and, as a consequence, across the resistors 19 through 21 of the current-setting device 17 until it is equal to the voltage across the resistors 66 through 69 of the resistance bridge in the regulator 18. At that instant, the capacitor 71 will be connected to a resistor 96 by the contact 91. After that, the capacitor 71 will be disconnected from the resistor 96, the contacts 86 and 87 will open, and the contacts 94 and 95 will close, as already described above.

If the signals coming from the sensors 13 and 15 are equal, the polarized relay 81 will remain in the neutral position, but the relay assembly 70 will, as before, open the contacts 86 and 87 and close the contacts 94 and 95 after comparing the signals.

In the case of disturbances which may occur in the course of welding, such as fluctuations in supply voltage, welding current, or the torque of the motor 12, causing the welding current to deviate from the value to which the voltage across the capacitor 71 corresponds, the apparatus disclosed herein will increase or decrease the speed of the moving platen 2 until the difference, or error, is reduced to zero. For example, should the welding current exceed the value corresponding to the voltage across the capacitor 71, the speed of the moving platen 2 will be increased. Conversely, when the welding current decreases, the speed of the moving platen 2 will be decreased.

What is claimed is:

1. An apparatus for automatic control of a flash butt welding machine for metal parts, comprising, in combination, a control box controlling in the machine a drive for a moving platen carrying one of said metal parts, a welding-current sensor deriving a signal from a transformer forming part of the welding machine, said sensor being connected to said control box, a travel sensor for said moving platen connected to said control box via a current-setting device, and a regulator adjusting the signals of said welding-current sensor to changing welding conditions, depending on the magnitude of the signal furnished by said welding-current sensor, after transients in the welding current, ordinarily present during the early state of flashing, have subsided, said current-setting device and said adjusting regulator constituting means for comparing signals from said welding-current sensor and said current-setting device, and adjusting the current in the welding machine as a function of the distance traveled by said moving platen.

2. The apparatus as defined in claim 1, in which said adjusting regulator incorporates a resistance bridge one arm of which is connected to the output of said welding-current sensor, and another arm which is connected to the input of said current-setting device, and a storage network, connected to the output of said resistance bridge on one side and to said input of the current-setting device on the other, for storing the adjusted value of the welding current.

3. The apparatus as defined in claim 2, in which said storage network contains a cathode follower the input circuit of which is connected to said output of the resistance bridge via a capacitor and the output circuit of which is connected to said current-setting device.

4. The apparatus as defined in claim 1, in which said travel sensor has a disc with through holes, coupled to said moving platen so that it rotates as this platen moves, and further comprising a light source on one side of said disc and a photo-cell on the other, while a transducer of said travel sensor is a light-pulse counter.

* * * * *